E. B. CUSHMAN.
OIL FEEDER.
APPLICATION FILED JAN. 19, 1920.
1,369,327.
Patented Feb. 22, 1921.
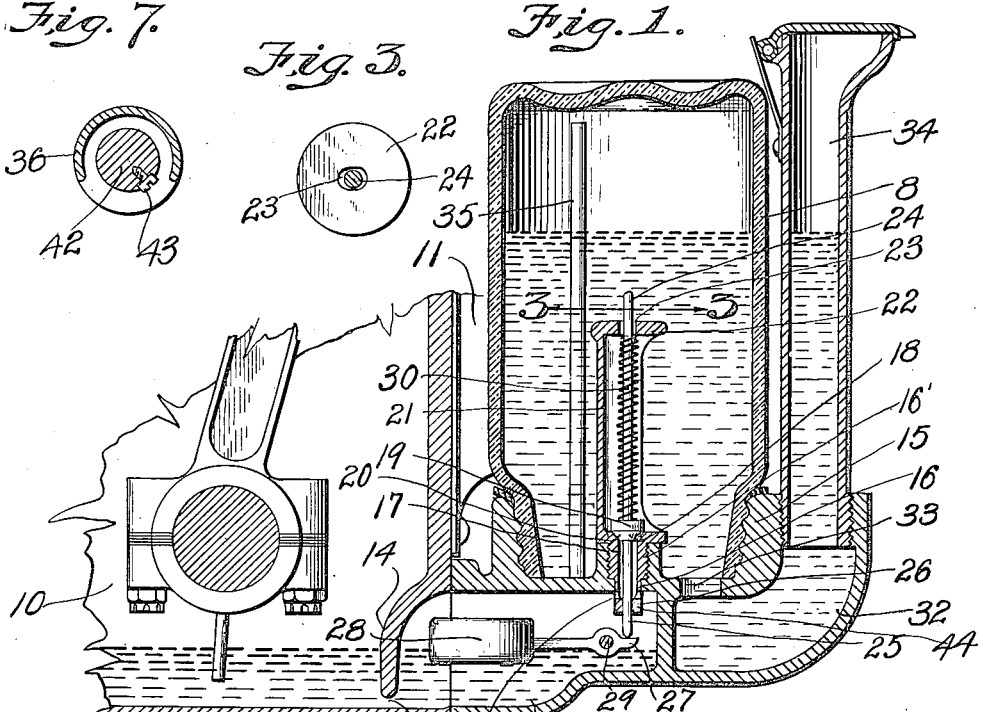
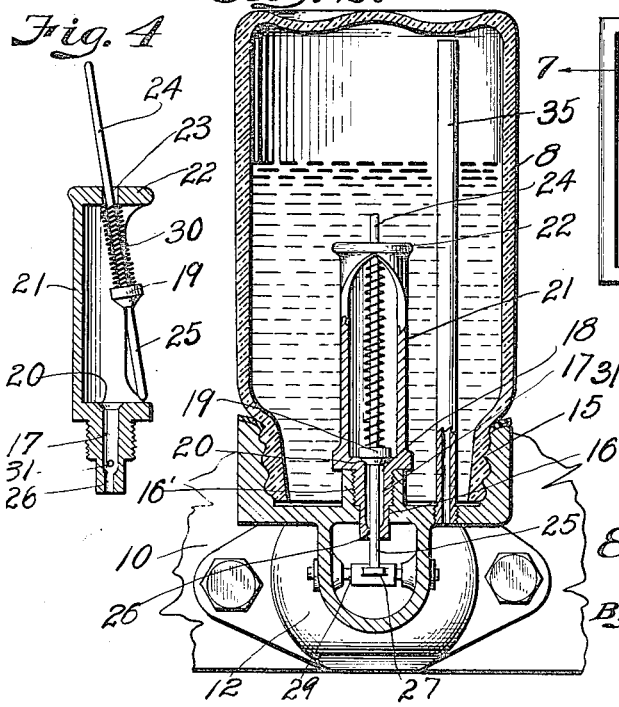
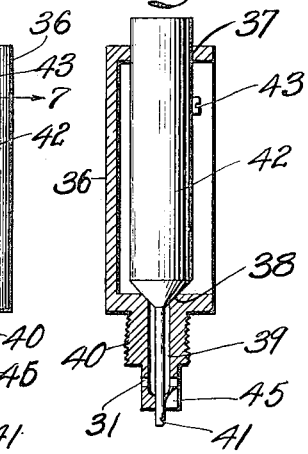
Inventor.
Everett B. Cushman
By Arthur C. Brown
Attorney.

UNITED STATES PATENT OFFICE.

EVERETT B. CUSHMAN, OF TOPEKA, KANSAS, ASSIGNOR TO THE PIERSON MANUFACTURING COMPANY, OF TOPEKA, KANSAS, A CORPORATION OF KANSAS.

OIL-FEEDER.

1,369,327.     Specification of Letters Patent.     Patented Feb. 22, 1921.

Application filed January 19, 1920. Serial No. 352,385.

*To all whom it may concern:*

Be it known that I, EVERETT B. CUSHMAN, a citizen of the United States, residing at Topeka, in the county of Shawnee and State of Kansas, have invented certain new and useful Improvements in Oil-Feeders; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to lubricating systems for internal combustion engines or analogous structures and contemplates the provision of means for automatically controlling the flow of lubricant from a suitable reservoir into the oil or lubricant container of an engine or analogous structure.

An object of the invention is to provide a simple and easily operated means for maintaining the oil level in the crank case of an internal combustion engine or analogous structure constant, for insuring the efficient lubrication of the working parts of the engine particularly where the splash system of lubrication is employed.

The invention is illustrated as consisting of an automatic lubricant feeding mechanism including a valve which may be normally held seated by any suitable means, independent of the valve *per se*, for cutting off the flow of lubricant to the chamber of the engine. The independent seating means is shown as a spring or weight to prevent the unseating of the valve by vibration of the engine during use.

Means controlled by variation of the oil level in the container of the engine is also provided to control the unseating of the valve, such means embodying, preferably, a float which, upon falling with the level of oil in the crank case of the engine, will unseat the valve, moving it against the action of the spring or weighted member so as to permit oil to flow into the crank case or oil container until the float is lifted sufficiently to permit the seating of the valve by the spring or weight.

In the drawings,

Figure 1 is a vertical section through the automatic oil feed.

Fig. 2 is a vertical section through the automatic oil feed taken at right angles to the section illustrated in Fig. 1.

Fig. 3 is a cross section on the line 3—3 of Fig. 1.

Fig. 4 is a detailed section of the valve structure illustrating the manner of assembling the same.

Fig. 5 is a side elevation of a modified form of the valve mechanism.

Fig. 6 is a longitudinal section through the modified form of valve structure, and Fig. 7 is a cross section taken on the line 7—7 of Fig. 5.

Referring now to the drawings:

The container 10 is illustrated as a crank case adapted for use with a splash system of lubrication. The crank case or container is illustrated as provided with an automatic oil supply mechanism which may be supported thereon by any suitable means as, for example, the bracket 11. The container 10 is in communication with a float chamber 12, through an opening 13 formed by a diaphragm 14 which separates the upper portion of the float chamber from the interior of the crank case or container and serves as a baffle to prevent actuation of the float upon agitation of the oil by the crank.

The top of the float chamber also comprises the bottom of a cup or internally threaded collar 15, which supports a reservoir 8, from which the supply of oil to the crank case is augmented through an opening, normally closed by a float actuated valve. The floor of the reservoir formed by the bottom of the cup or collar 15 is provided with an opening 16 surrounded by an internally threaded valve cage supporting seat 16' into which the threaded neck or port 17 of the valve cage is adapted to be secured. The neck is provided with a through port 18 so that communication may be established between the reservoir and the float chamber 12 when the normally seated valve 19 is moved off its seat 20 at the upper end of the port 17. The valve cage is provided with a hood 21 having a lateral flange or head 22 at its upper end, provided with an opening 23 in axial alinement with the port 18 of the neck 17, the port 23 being adapted to receive a guide or stabilizing rod 24 on the valve 19, which is in coöperative relation with the depending stem 25, guided in the constricted portion 26 of the port 17 so as to insure the proper seating of the valve when it has been lifted from its seat by the toe 27 of the float 28, pivoted at 29 within the float chamber 12.

In order to insure proper seating of the valve, I provide an augmenting seating means in the preferred form, shown as consisting of a spring 30, one end of which bears against the valve and the other against the flange or cap 22 so that when the float 28 is not in valve unseating position, there will be no communication between the reservoir or container 8 and the float chamber.

By reference to Fig. 4 it will be observed that the valve and its cage may be readily assembled by introducing the stem or stabilizing rod 24 through the opening 23 in the manner shown, and raising the valve against the action of the spring until the lower end of stem 25 clears the valve seat, whereupon the stem 25 may be introduced into port 30 and the constricted portion 26 so that it will move in a true rectilineal direction during operation and the seating of the valve will be assured.

In order to insure a proper action of the valve, I prefer to have the constricted portion 26 of about the same diameter as the stem 25 and to permit the oil to discharge through the diametrically opposite ports 31.

By reference to the drawings it will be apparent that the valve and its cage may be easily assembled and introduced into the seat in an expeditious and efficient manner without the necessity for employing special tools, the assembling operation being comparatively simple, and the cage may be readily put in place before the introduction of the reservoir 8, which, for convenience, may consist of an inverted, known type of preserving jar, the advantage of which is that the reservoir will be transparent so that inspection may be had of the contents to determine the supply of available oil therein.

For convenience, I may construct the float chamber, the seat for the reservoir, the valve cage, and a filler chamber 32 of a single casting, the filler chamber 32 being in constant communication with the reservoir 8 through the port 33 and the filler chamber 32 may support a filler tube 34 of approved construction, there being also a vent tube 35 extending upwardly within the reservoir 8 and communicating with the atmosphere below the under surface of the casting constituting the body portion of the automatic filling mechanism.

When the parts are assembled as shown in Figs. 1 to 4, both inclusive, the filling mechanism will not function so long as the desired oil level is maintained in the container or crank case 10. When, however, the oil level falls below a determined point in the crank case, the float will fall with it, raising the toe or valve actuating end 27 against the stem 25 to cause the valve 19 to be unseated against the action of the spring 30. Oil will then pass through the port 17 through openings 31 into the float chamber 12 and into the crank case until the level has been raised sufficient to move the toe 27 away from the actuating contact with stem 35, whereupon the spring 30 will cause a positive seating of the valve and hold it seated against accidental unseating, due to vibrating of the engine or from other causes. In other words, it is important that the valve be maintained positively upon its seat at all times, irrespective of excessive vibration of the engine or bolting thereof, the feeding mechanism being designed to respond only to variations in the position of the float, caused by changes in the oil level within the crank case. The advantage of this will be apparent when it is understood that without some positive means for maintaining the valve upon the seat, the engine vibrations and similar causes may create a slight unseating movement of the valve and while a single unseating movement would have no appreciable effect upon the oil level, a number of these movements would result in flooding the crank case or container 10.

In Figs. 5, 6 and 7 I have shown a slightly modified form of valve mechanism, which includes a casing 36 provided with an opening 37 in the upper end thereof, alining with a valve seat 38 and with the discharge port or opening 39 of the neck 40, which corresponds to the neck 16, in which the port 17 is located in the preferred form. The valve stem 41 extends axially through the port 37 and projects through the lower end thereof for engagement with the projection or toe 27 of the float 28. The mechanism coöperating with the structure shown in Figs. 5, 6 and 7 is substantially the same as that illustrated in connection with the preferred embodiment of my invention, the essential difference being that the valve 19', which corresponds to valve 19 in the preferred form, is maintained upon its seat by a relatively large weighted body 42, preferably formed integrally with the valve while normally maintaining it seated during vibrations of the engine, and in order to prevent the weight from becoming disconnected with its cage or casing 36, I provide a stop, shown as a set screw 43, which is introduced into the side of the weight, as shown in Figs. 5, 6 and 7, so that the stop or projection may contact with the upper part of the cage or casing to prevent undue longitudinal movement of the weight with respect thereto.

If desired, the lower constructed portions of the necks 16 and 40 may be provided with slits 44 and 45 respectively, adjacent to the transverse openings therein to permit dirt and foreign matter to work out through the ports as the oil flows therethrough and thereby eliminate liability of the valve sticking by accumulation of foreign matter.

What I claim and desire to secure by Letters-Patent is:

1. In an automatic oil feed, a float chamber adapted to discharge into the crank case of an engine, an oil reservoir above the float chamber and ported to establish oil feeding communication between the reservoir and chamber, a valve casing including a stem projecting into the ported portion of said reservoir, a valve stem in said casing stem, a valve on the valve stem, means normally urging said valve against its seat, and a float for unseating the valve.

2. In an automatic oil feed, a float chamber adapted to discharge into the crank case of an engine, an oil reservoir above the float chamber and ported to establish oil feeding communication between the reservoir and chamber, a valve casing including a stem projecting into the ported portion of said reservoir, a valve stem in said casing, a valve on the valve stem, means normally urging said valve against its seat, and a float for unseating the valve.

3. In an automatic oil feed, a reservoir, a float chamber adapted to discharge into the crank case of an engine, an oil reservoir above the float chamber, a valve casing in said reservoir, a stem thereon projecting into the float chamber and ported to establish oil feeding communication between the reservoir and chamber, a valve stem in said casing stem, a valve on said valve stem, a spring coiled about said valve stem and engaging said valve for urging it against its seat, and a float for unseating said valve.

4. In an automatic oil feed, a float chamber adapted to discharge into the crank case of an engine, a recessed member above the float chamber and having an orifice communicating therewith, a removable inverted reservoir received in said recessed member, a valve casing carried by said recessed member, a valve stem in said casing and extending into said float chamber, a valve thereon, means normally urging said valve against its seat, a float, and a float-actuated lever for engaging said valve stem and unseating said valve upon the falling of the oil level in the float chamber.

5. In an automatic oil feed, a body comprising a float chamber, an inverted transparent reservoir detachably carried by the body, a valve casing carried by the body and projecting into said reservoir, said valve casing provided with a port to establish communication between the reservoir and float chamber, a valve normally cutting off the flow of lubricant to the float chamber, a float within the float chamber for unseating the valve, and means engaging said valve for normally holding it seated.

6. In an automatic oil feed, a body comprising a float chamber, an inverted transparent reservoir detachably carried by the body, a valve casing carried by the body and projecting into said reservoir, said valve casing provided with a port to establish communication between the reservoir and float chamber, a valve normally cutting off the flow of lubricant to the float chamber, a valve stem carrying said float and being removably mounted within the casing, a valve within the float chamber for unseating the valve, a means engaging said valve for normally holding it seated.

7. In an automatic oil feed, a valve structure comprising a casing having a valve seat thereon and provided with a port communicating with said valve seat, the top of said casing provided with an opening, alined with said port, a valve stem extending through the port and said opening, and a valve on said stem, said stem adapted to be moved longitudinally and laterally for removal from the casing.

8. In an automatic oil feed, a valve casing provided with parallel upper and lower end portions, said end portions provided with alining openings, a valve seat in the inner surface of the lower end portion, a valve stem extended through said openings, a valve on said stem for seating on said seat, and a spring coiled about said stem for normally maintaining said valve on said seat, said stem being adapted to be moved longitudinally and swung laterally to disconnect the stem and casing.

In testimony whereof I affix my signature.

EVERETT B. CUSHMAN.